US012603378B2

(12) United States Patent
Lee

(10) Patent No.: US 12,603,378 B2
(45) Date of Patent: Apr. 14, 2026

(54) BATTERY CONNECTOR HEAD WITH GASKET FOR BATTERY MODULE, BATTERY PACK, AND VEHICLE INCLUDING THE SAME

(71) Applicant: LG ENERGY SOLUTION, LTD., Seoul (KR)

(72) Inventor: Chang-Hun Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 510 days.

(21) Appl. No.: 18/033,147

(22) PCT Filed: Sep. 22, 2022

(86) PCT No.: PCT/KR2022/014199
§ 371 (c)(1),
(2) Date: Apr. 21, 2023

(87) PCT Pub. No.: WO2023/058963
PCT Pub. Date: Apr. 13, 2023

(65) Prior Publication Data
US 2023/0387539 A1 Nov. 30, 2023

(30) Foreign Application Priority Data

Oct. 8, 2021 (KR) ........................ 10-2021-0134408

(51) Int. Cl.
*H01M 50/296* (2021.01)
*H01M 50/143* (2021.01)
(Continued)

(52) U.S. Cl.
CPC ....... *H01M 50/296* (2021.01); *H01M 50/143* (2021.01); *H01M 50/262* (2021.01); *H01M 50/383* (2021.01); *H01M 2220/20* (2013.01)

(58) Field of Classification Search
CPC .................................................. H01M 50/269
See application file for complete search history.

(56) References Cited

U.S. PATENT DOCUMENTS

2010/0055550 A1* 3/2010 Scott ................... H01M 50/216
429/100
2014/0242423 A1 8/2014 Jones
(Continued)

FOREIGN PATENT DOCUMENTS

CN 207852758 U 9/2018
CN 108112244 B 6/2021
(Continued)

OTHER PUBLICATIONS

Extended European Search Report for European Application No. 22878784.2, dated Dec. 16, 2024.
(Continued)

*Primary Examiner* — Maria Laios
*Assistant Examiner* — Jordan E Berresford
(74) *Attorney, Agent, or Firm* — Birch, Stewart, Kolasch & Birch, LLP

(57) ABSTRACT

A battery module includes a cell assembly including at least one battery cell, a module case in which the cell assembly is accommodated, and a connector mounted on the module case. The connector includes a connector terminal for electrical connection with the battery cell, a connector housing surrounding the connector terminal, a connector header body coupled to the connector housing and mounted on the module case in such a manner that at least a part of the connector header body is inserted into the module case, and a connector gasket located between the module case and the connector header body and having a melting point of 1000° C. or higher.

13 Claims, 8 Drawing Sheets

(51) Int. Cl.
  *H01M 50/262* (2021.01)
  *H01M 50/383* (2021.01)

(56) References Cited

U.S. PATENT DOCUMENTS

| | | | |
|---|---|---|---|
| 2015/0017490 A1* | 1/2015 | Tao ................... | H01M 10/3909 |
| | | | 429/61 |
| 2016/0141584 A1 | 5/2016 | Eichorn | |
| 2018/0190965 A1 | 7/2018 | Lee et al. | |
| 2020/0373542 A1 | 11/2020 | Zhang et al. | |
| 2021/0043982 A1 | 2/2021 | Bradwell et al. | |
| 2021/0091380 A1 | 3/2021 | Atala et al. | |
| 2022/0367954 A1 | 11/2022 | Lee et al. | |

FOREIGN PATENT DOCUMENTS

| | | | | |
|---|---|---|---|---|
| IT | 201800011122 A1 * | 6/2020 | ........... | H01R 13/112 |
| JP | 2016-511512 A | 4/2018 | | |
| KR | 10-2016-0069998 A | 6/2016 | | |
| KR | 10-1668787 B1 | 10/2016 | | |
| KR | 10-1988845 B1 | 6/2019 | | |
| KR | 10-2020-0112934 A | 10/2020 | | |
| KR | 10-2021-0069424 A | 6/2021 | | |
| KR | 10-2021-0098705 A | 8/2021 | | |
| WO | WO2016/167866 A1 | 10/2016 | | |
| WO | WO2021/107517 A1 | 6/2021 | | |

OTHER PUBLICATIONS

International Search Report (PCT/ISA/210) issued in PCT/KR2022/014199 mailed on Dec. 23, 2022.

* cited by examiner

FIG. 6

BATTERY CONNECTOR HEAD WITH GASKET FOR BATTERY MODULE, BATTERY PACK, AND VEHICLE INCLUDING THE SAME

TECHNICAL FIELD

The present disclosure relates to a battery module, a battery pack, and a vehicle including the same, and more particularly, to a battery module including an improved connector, a battery pack, and a vehicle including the same. The present application claims priority to Korean Patent Application No. 10-2021-0134408 filed on Oct. 8, 2021 in the Republic of Korea, the disclosures of which are incorporated herein by reference.

BACKGROUND ART

Because secondary batteries have high applicability according to product groups and electrical characteristics such as high energy density, the secondary batteries are commonly applied not only to mobile devices but also to electric vehicles or hybrid vehicles driven by electric power sources, energy storage systems, etc. Because secondary batteries may radically reduce the use of fossil fuel and do not generate any by-products that come with energy consumption, the secondary batteries are gaining attention as a new alternative energy source for improving eco-friendliness and energy efficiency.

A battery pack applied to an electric vehicle or the like has a structure in which a plurality of cell assemblies including a plurality of secondary battery cells are connected in series to obtain high power. A battery cell includes positive and negative current collectors, a separator, an active material, and an electrolytic solution, and may be repeatedly charged and discharged through an electrochemical reaction between elements.

As the need for a large-capacity structure including the use as an energy storage source has recently increased, the demand for a battery pack having a multi-module structure in which a plurality of battery cells are connected in series and/or in parallel has increased. When a battery pack is configured, a method of first configuring a battery module including at least one battery cell and adding other elements by using the at least one battery module to configure a battery pack is general. The number of battery modules included in the battery pack, or the number of battery cells included in the battery module may be set in various ways according to a required output voltage or charge/discharge capacity.

A battery module packages battery cells and various electronic components in a module case, and includes a connector for electrical connection with external devices outside the module case. The connector may be a connection connector for electrically connecting a plurality of battery modules, a sensing connector for monitoring a voltage of battery cells, a charging connector for connecting to a charging device for charging battery cells, or an output connector for connecting to a motor that is driven by using energy charged in battery cells.

Because a conventional battery module is manufactured such that a plurality of battery cells are densely packed in a narrow space, it is important to prevent fire or the like. In particular, when such a battery module and a battery pack including the same are applied to a vehicle, it is necessary to pass a strict safety test.

In a connector provided in an existing battery module, all portions except a connector terminal are manufactured by a general plastic injection product, and the connector is sealed by welding with a module case. When an abnormally high temperature occurs in the battery module to which the plastic injection product is applied, the battery module easily melts, and thus, a structure collapses without maintaining airtightness. In particular, a battery module equipped with such a connector or a battery pack that is a set of battery modules may not pass a thermal runaway test. A thermal runaway test refers to a test in which a battery pack or system provides a thermal event alarm signal 5 minutes before thermal diffusion due to thermal runaway of a battery, which in turn causes a danger in the passenger compartment of a vehicle, according to GB standards.

Accordingly, in order to satisfy the GB standards, a connector for preventing the spread of a high-temperature environment caused by a flame or the like and/or a high-pressure environment caused by venting gas is absolutely required.

DISCLOSURE

Technical Problem

The present disclosure is designed in consideration of the above problems, and therefore the present disclosure is directed to providing a battery module including an improved connector in which a high-temperature environment caused by a flame or the like in a battery module and/or a high-pressure environment caused by venting gas in the battery module is prevented from spreading to the outside.

The present disclosure is also directed to providing a battery pack and a vehicle including the battery module to increase safety against fire or explosion.

However, the technical purpose to be solved by the present disclosure are not limited to the above, and other objects not mentioned herein will be clearly understood by one of ordinary skill in the art from the following disclosure.

Technical Solution

In one aspect of the present disclosure, there is provided a battery module including a cell assembly including at least one battery cell, a module case in which the cell assembly is accommodated, and a connector mounted on the module case. The connector includes a connector terminal for electrical connection with the at least one battery cell, a connector housing surrounding the connector terminal, a connector header body coupled to the connector housing and mounted on the module case so that at least a part of the connector header body is in the module case, and a connector gasket located between the module case and the connector header body and having a melting point of 1000° C. or higher.

An opening may be formed in the module case, and the connector header body may be in surface contact with the module case via the connector gasket to keep the opening airtight.

The connector gasket may have a frame shape with a central opening of a same size as a size of the opening.

The connector gasket and the connector header body may be fastened to the module case with a bolt.

The connector gasket may be a silicone gasket.

The connector header body may be formed of a ceramic or metal material with a melting point of 1000° C. or higher.

The connector housing may be coupled to the connector header body by press-fitting or hook-type fastening.

The connector housing and the connector header body may be a single integrally formed product.

In another aspect of the present disclosure, there are provided a battery pack including at least one battery module and a vehicle including at least one battery pack.

The connector housing may extend from a side surface of the connector header body, and the gasket may contact an outer surface of the connector housing and the side surface of the connector header body.

Advantageous Effects

According to the present disclosure, there is provided a battery module including an improved connector, that is, a high heat-resistant connector, in which a high-temperature environment caused by a flame in a battery module and/or a high-pressure environment caused by venting gas in the battery module is prevented from spreading to the outside.

Because a battery module according to the present disclosure includes a connector including a connector gasket with a melting point of 1000° C. or higher, even when a flame occurs in the battery module and thus an abnormally high temperature state is caused, flame diffusion to the outside of the battery module may be prevented. Also, even when venting gas is generated in the battery module and thus an abnormally high pressure state is caused, explosion through the connector may be prevented.

As such, according to the present disclosure, there is provided a battery module including a high heat-resistant sealing connector in which, even when thermal runaway occurs, an airtight structure of the battery module is maintained and a high temperature/high-pressure environment is tolerated.

For example, even when a temperature adjacent to a module case rises to about 600° C. (at least 5 minutes), the battery module including a connector as proposed in the present disclosure may withstand high temperature/high pressure (100 kpa), and thus, heat transfer may be prevented. Accordingly, according to the present disclosure, the battery module having improved safety, and a battery pack and a vehicle including the battery module may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 6 is a perspective view illustrating a connector gasket that may be included in a battery module, according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure. In addition, in order to help the understanding of the present disclosure, the accompanying drawings are not drawn to scale, but dimensions of some components may be exaggerated.

Figure 1:
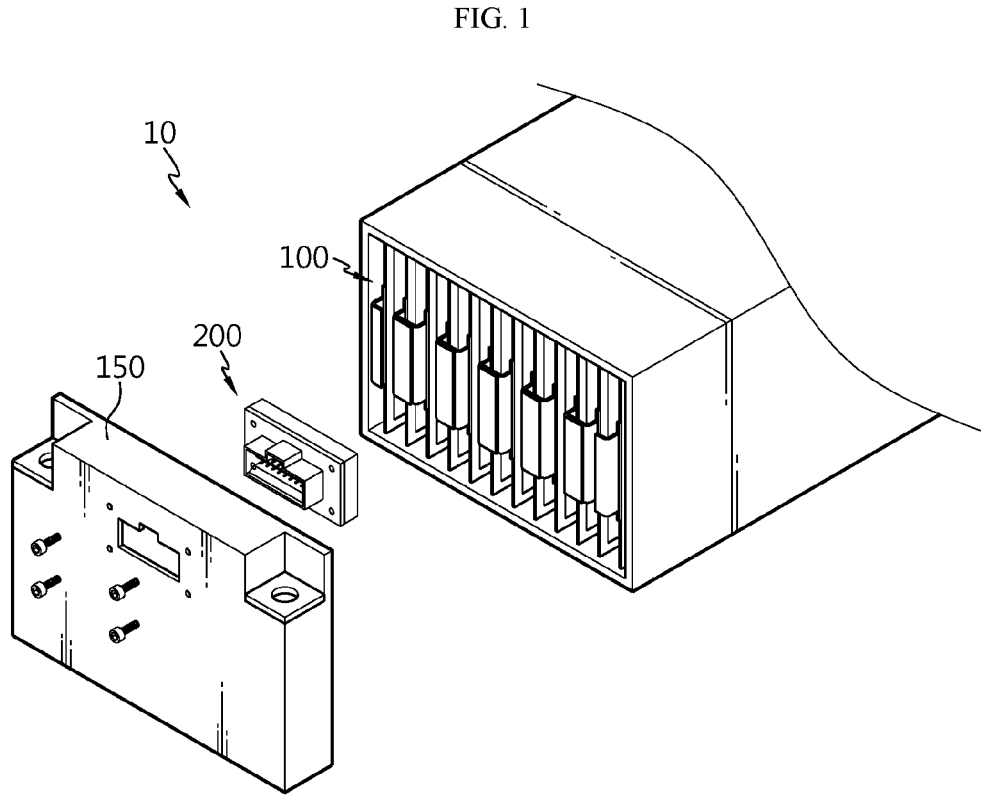
FIG. 1 is a schematic exploded perspective view illustrating a battery module, according to an embodiment of the present disclosure.
Figure 2:
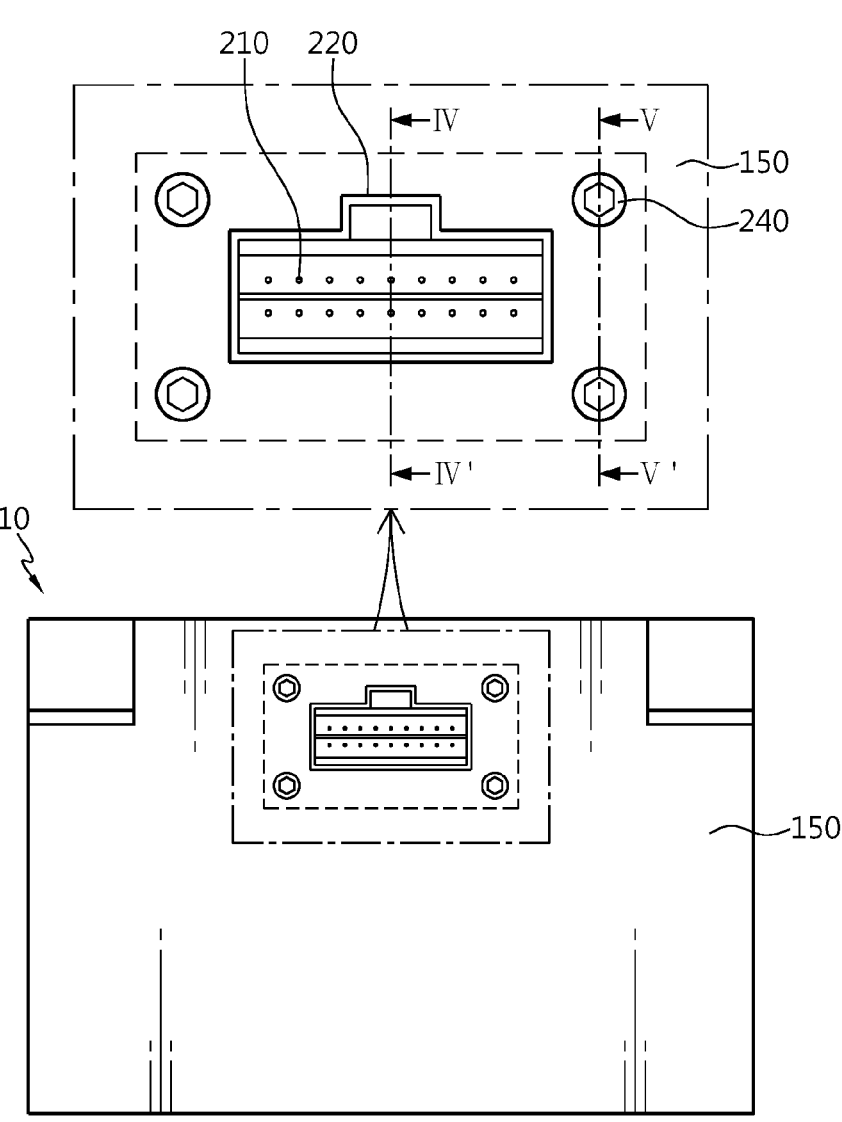
FIG. 2 illustrates a front view of a battery module and an enlarged view of a connector portion, according to an embodiment of the present disclosure.
Figure 3:
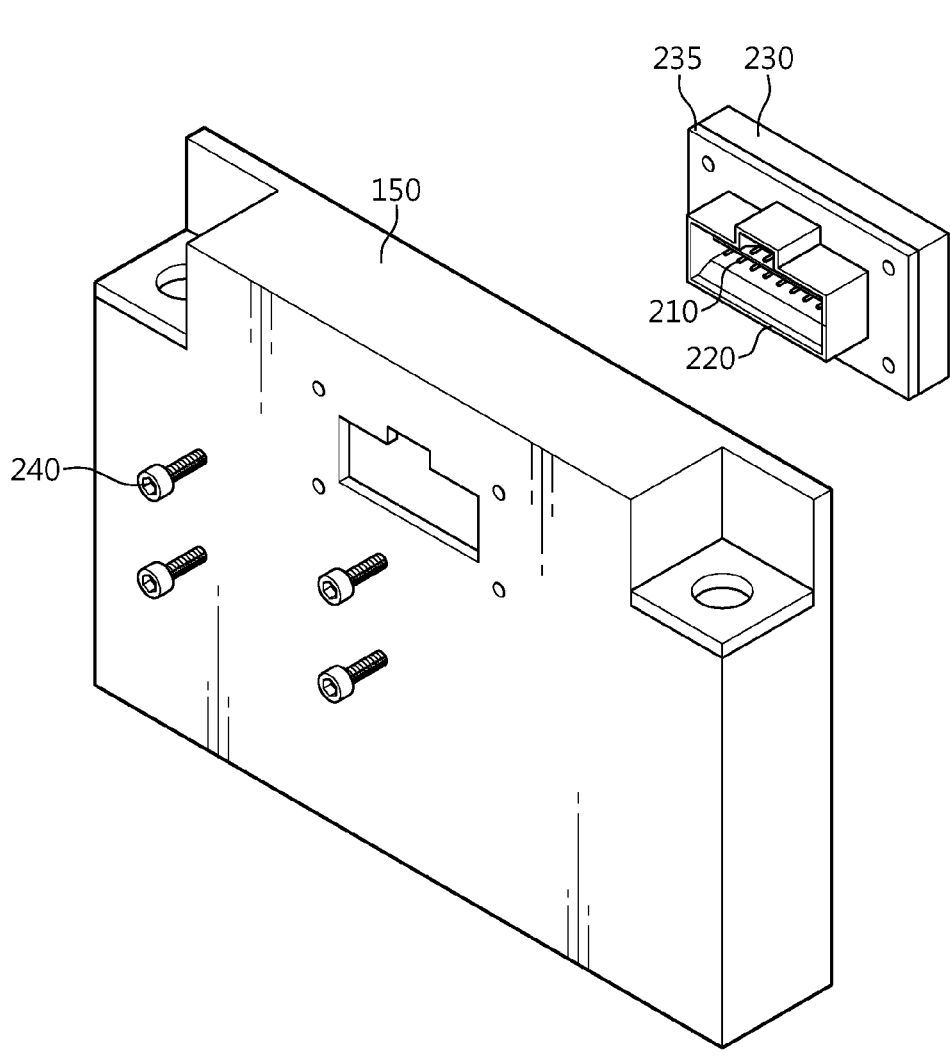
FIG. 3 is a perspective view illustrating a connector portion separated from a battery module, according to an embodiment of the present disclosure.
Figure 4:
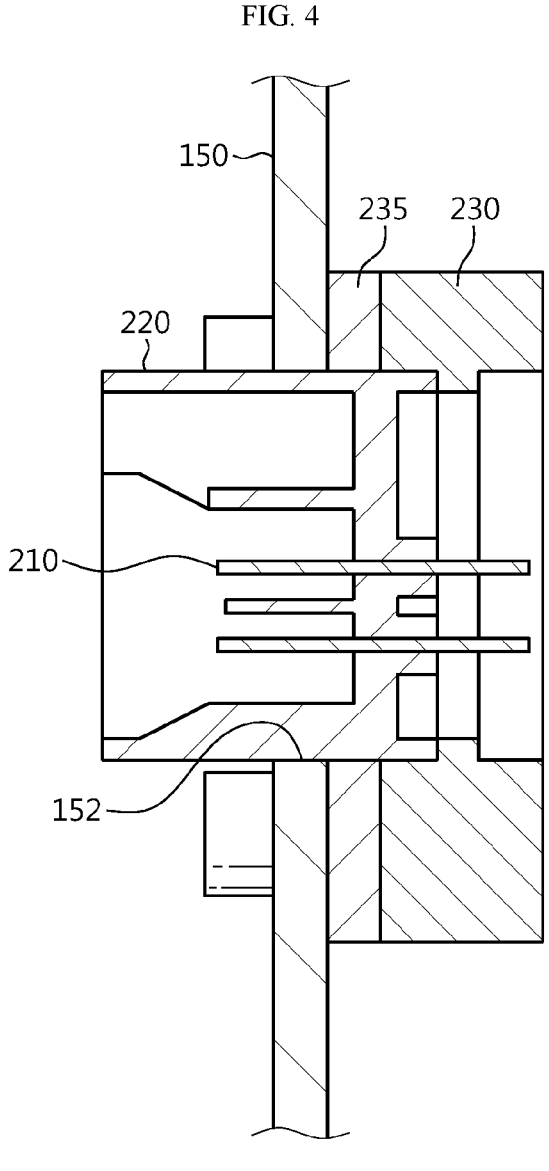
FIG. 4 is a partial cross-sectional view of FIG. 1, taken along line IV-IV' of FIG. 2.
Figure 5:
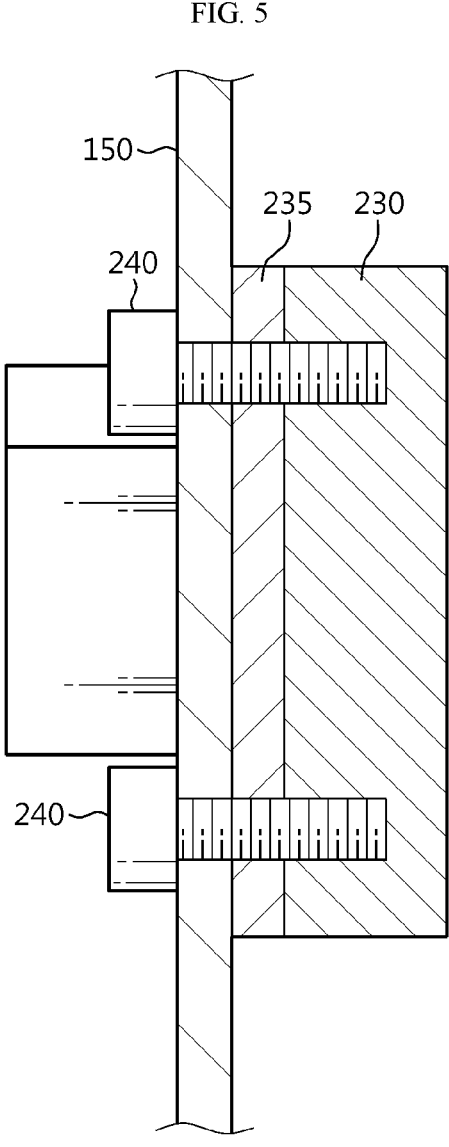
FIG. 5 is a partial cross-sectional view of FIG. 1, taken along line V-V' of FIG. 2.
Figure 6:
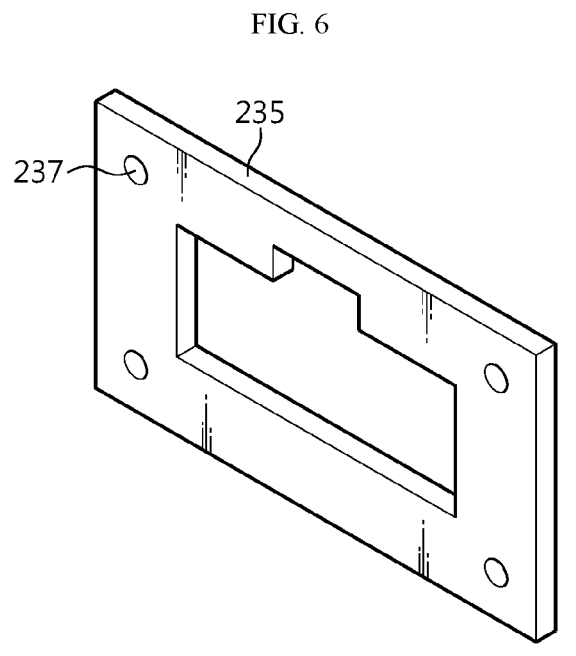

FIG. 1 is a schematic exploded perspective view illustrating a battery module, according to an embodiment of the present disclosure. FIG. 2 illustrates a front view of a battery module and an enlarged view of a connector portion, according to an embodiment of the present disclosure. FIG. 3 is a perspective view illustrating a connector portion separated from a battery module, according to an embodiment of the present disclosure. FIG. 4 is a partial cross-sectional view of FIG. 1, taken along line IV-IV' of FIG. 2. FIG. 5 is a partial cross-sectional view of FIG. 1, taken along line V-V' of FIG. 2. FIG. 6 is a perspective view illustrating a connector gasket that may be included in a battery module, according to an embodiment of the present disclosure.

First, referring to FIG. 1, a battery module 10 according to an embodiment of the present disclosure includes a cell assembly 100, a module case 150, and a connector 200.

The cell assembly 100 includes at least one battery cell. The at least one battery cell of the cell assembly 100 may be a pouch-type secondary battery, and a plurality of battery cells may be stacked and arranged in the cell assembly 100. The plurality of battery cells may be electrically connected to each other, and each of the battery cells may include an electrode assembly, a casing in which the electrode assembly is accommodated, and electrode leads protruding outward from the casing and electrically connected to the electrode assembly.

The electrode leads may include a positive electrode lead and a negative electrode lead. The positive electrode lead and the negative electrode lead may be located in opposite directions in a longitudinal direction of the battery cell, or the positive electrode lead and the negative electrode lead may be located in the same direction in the longitudinal direction of the battery cell. The positive electrode lead and the negative electrode lead may be formed of various materials. For example, the positive electrode lead may be formed of an aluminum material and the negative electrode lead may be formed of a copper material.

The electrode leads may be electrically coupled to a bus bar (not shown). The battery cell may have a structure in which a plurality of unit cells arranged in the order of a positive electrode plate-separator-negative electrode plate, or bicells arranged in the order of a positive electrode plate-separator-negative electrode plate-separator-positive electrode plate-separator-negative electrode plate are stacked according to capacity.

The cell assembly 100 may be configured so that a plurality of battery cells are stacked on each other. The battery cell may have any of various structures, and also, the plurality of battery cells may be stacked in any of various ways.

The cell assembly 100 may include a plurality of cartridges (not shown) in which the battery cells are accommodated. Each cartridge (not shown) may be manufactured by using plastic injection molding, and a plurality of cartridges including receiving portions in which the battery cells may be accommodated may be stacked. A terminal element may be provided in a cartridge assembly in which the plurality of cartridges are stacked. The terminal element that is a main element connected to a battery cell includes a positive electrode terminal and a negative electrode terminal, and the terminal element may be provided with a terminal bolt to be electrically connected to the outside. The battery cell may have any of various shapes.

The module case 150 has an empty inner space. The module case 150 accommodates the cell assembly 100 and forms the exterior of the battery module 10. The module case 150 may have a shape corresponding to a shape of the cell assembly 100 or the cartridge assembly. For example, when the cell assembly 100 or the cartridge assembly has a hexahedral shape, the module case 150 may also have a hexahedral shape corresponding to the cell assembly 100 or the cartridge assembly. Various electronic components may be included in the module case 150, and may include, for example, an internal circuit board (IC) or a battery management system (BMS). The electronic components such as the ICB and the BMS may be electrically connected to the plurality of battery cells.

The module case 150 may be manufactured by bending a plate formed of a metal material, or may be manufactured by a plastic injection product. The module case 150 may be manufactured integrally or as a separate type. In general, the module case 150 may be provided with at least one surface open so that the cell assembly 100 is inserted through an open portion and then the open portion is closed. The module case 150 may be provided in a substantially rectangular parallelepiped shape.

The module case 150 may have any of various configurations. For example, the module case 150 may include a U-shaped frame that accommodates the cell assembly 100 and has an open top, and a top plate located on the U-shaped frame to cover the cell assembly 100. A top surface, a front surface, and a rear surface of the U-shaped frame are open, and thus, an end plate may be located on each of the front surface and the rear surface of the U-shaped frame to block the open front surface and rear surface.

In another example, the module case 150 may include a rectangular tube mono-frame in which both facing sides are open, and a front cover and a rear cover covering the both facing sides of the mono-frame. The present disclosure is not limited to a specific structure of the module case 150.

The connector 200 is mounted on the module case 150. The connector 200 may be mounted on a portion that is easily electrically connected to the cell assembly 100 accommodated in the module case 150. For example, the connector 200 may be mounted on a portion close to an electrode lead of a battery cell included in the cell assembly 100. For example, as shown, the connector 200 may be mounted on the end plate, the front cover, or the rear cover adjacent to a portion where an electrode lead of a battery cell may be located in the module case 150. The connector 200 may be provided as any of various types of electrical connection components or connection members for connection to the BMS that may provide data about a voltage or a temperature of the battery cells in the battery module 10. The connector 200 is coupled to the module case 150 to transmit the data about the voltage or the temperature to the outside.

Referring to FIGS. 2 to 6, the connector 200 includes a connector terminal 210, a connector housing 220, and a connector header body 230.

The connector terminal 210 is used for electrical connection to a battery cell of the cell assembly 100. The connector terminal 210 may include a conductive material such as copper (Cu).

The connector housing 220 surrounds the connector terminal 210. The connector housing 220 may accommodate the connector terminal 210 and may expose one end.

The connector housing 220 is coupled to the connector header body 230. The connector housing 220 may be a component, separate from the connector header body 230, manufactured through plastic injection. The connector housing 220 may be coupled to the connector header body 230 by press-fitting or hook-type fastening.

The connector header body 230 may expose the end of the connector terminal 210 exposed from the connector housing 220. The connector header body 230 may be mounted on the module case 150 in such a manner that at least a part of the connector header body 230 is inserted into the module case 150, and the connector housing 220 is maintained outside the module case 150. The connector terminal 210 may pass through the connector housing 220 and the connector header body 230. A hole may be formed in the connector header body 230 so that the connector terminal 210 passes through the hole. The connector terminal 210 may be inserted into the module case 150 through the hole of the connector header body 230.

The connector header body 230 is coupled to the module case 150. The connector header body 230 may be coupled to the module case 150 by using any of various methods.

A connector gasket 235 is located between the module case 150 and the connector header body 230 and has a melting point of 1000° C. or higher.

Referring to FIGS. 4 and 5, in the present embodiment, an opening 152 is formed in the module case 150, and the connector header body 230 is in surface contact with the module case 150 via the connector gasket 235 inside the opening 152 to keep the opening 152 airtight. A fastening hole through which a bolt 240 passes may be formed in the connector header body 230.

All portions of the module case 150 except the opening 152 may be sealed by using a welding process. In this case, when thermal runaway occurs in the battery module 10, a portion where a flame and gas are most exposed is the connector 200. According to the present disclosure, the connector 200 may be improved to prevent a high-temperature environment caused by a flame in the battery module 10 and/or a high-pressure environment caused by venting gas in the battery module 10 from spreading to the outside.

With the connector gasket 235 and the connector housing 220 coupled to the connector header body 230, the connector housing 220 may be exposed through the opening 152 inside the module case 150, and then the module case 150 and the connector header body 230 may be fastened to each other with the bolt 240. Instead, the connector header body 230 may be in surface contact with the module case 150 via the connector gasket 235 inside the module case 150 and the bolt 240 may be fastened outside the module case 150, and then the connector housing 220 may be coupled to the connector header body 230 outside the module case 150.

As shown in FIG. 6, the connector gasket 235 may have a frame shape with a hollow of the same size as that of the opening 152. As shown in FIGS. 4 and 5, an outer periphery of the connector gasket 235 may coincide with an outer periphery of the connector header body 230.

The connector gasket 235 and the connector header body 230 may be fastened together to the module case 150 with the bolt 240. Reference numeral 237 denotes a fastening hole formed in the connector gasket 235 to allow the bolt 240 to pass therethrough.

Preferably, the connector gasket 235 is a silicone gasket. The connector gasket 235 maintains airtightness even when there is thermal runaway in the battery module 10, and is excellent in preventing a flame and gas from being exposed to the outside of the battery module 10 through the connector 200. The connector 200 includes the connector gasket 235, and thus, may be referred to as a high heat-resistant sealing connector. Because the battery 10 includes the high heat-resistant sealing connector, thermal runaway-related GB standards are satisfied.

The opening 152 may have a size enough to be covered by the fastening of the connector housing 220. The opening 152 may be larger than the connector housing 220, and thus, a part of the connector header body 230 may be visible from the outside of the module case 150.

The connector header body 230 may be formed of a ceramic or metal material with a melting point of 1000° C. or higher. When a flame occurs in the battery module 10, a temperature adjacent to the connector header body 230 may rise to about 600° C. or higher (at least 5 minutes), and thus, the connector header body 230 should be able to withstand high temperature/high pressure (100 kpa). When the connector header body 230 is formed of a ceramic or metal material with a melting point of 1000° C. or higher, a structure does not collapse even when a flame occurs in the battery module 10.

According to the present disclosure, the connector header body 230 may be maintained intact even in a relatively high-temperature environment. Even when a flame directly contacts the connector header body 230, the connector header body 230 does not melt. The connector gasket 235 may also be maintained intact even in a relatively high-temperature environment. Even when a flame directly contacts the connector gasket 235, the connector gasket 235 does not melt. The connector gasket 235 may prevent heat transfer to the connector housing 220 opposite to the module case 150.

In a conventional connector, portions corresponding to the connector housing 220 and the connector header body 230 are formed of only a plastic injection product, the portions melt during thermal runaway, and thus, smoke and a flame are exposed to the outside. The conventional connector does not include a sealing component such as the connector gasket 235. In the present disclosure, because there is provided the connector 200 including the connector housing 220 and the connector header body 230 with a melting point of 1000° C. or higher and high heat resistance, thermal runaway-related GB standards may be satisfied and airtightness may be maintained.

As such, according to the present disclosure, there is provided a battery module including a high heat-resistant sealing connector in which, even when thermal runaway occurs, an airtight structure of the battery module is maintained and a high temperature/high-pressure environment is tolerated.

In the present embodiment, the connector header body 230 and the connector housing 220 are separate components. In another embodiment, the connector housing 220 and the connector header body 230 may be a single integrally formed component. The connector header body 230 may be manufactured by manufacturing a clad metal disc including a heat-resistant metal material and a lightweight metal material and then processing the clad metal disc into the connector header body 230 having a desired shape. The connector housing 220 may be integrally manufactured with the connector header body 230 by placing the connector header body 230 and the connector terminal 210 in a mold, melting and injecting plastic into the mold, and then curing the same, which may be based on an insert injection method. When the connector housing 220 is integrally manufactured with the connector header body 230, there may be a strong binding force between the connector housing 220 and the connector header body 230 without using a separate fastening member. Accordingly, because the number of components is reduced, manufacturing costs may be reduced, and also, because a fastening process may be omitted, a manufacturing time may be reduced and a stable coupling structure may be formed.

Figure 7:
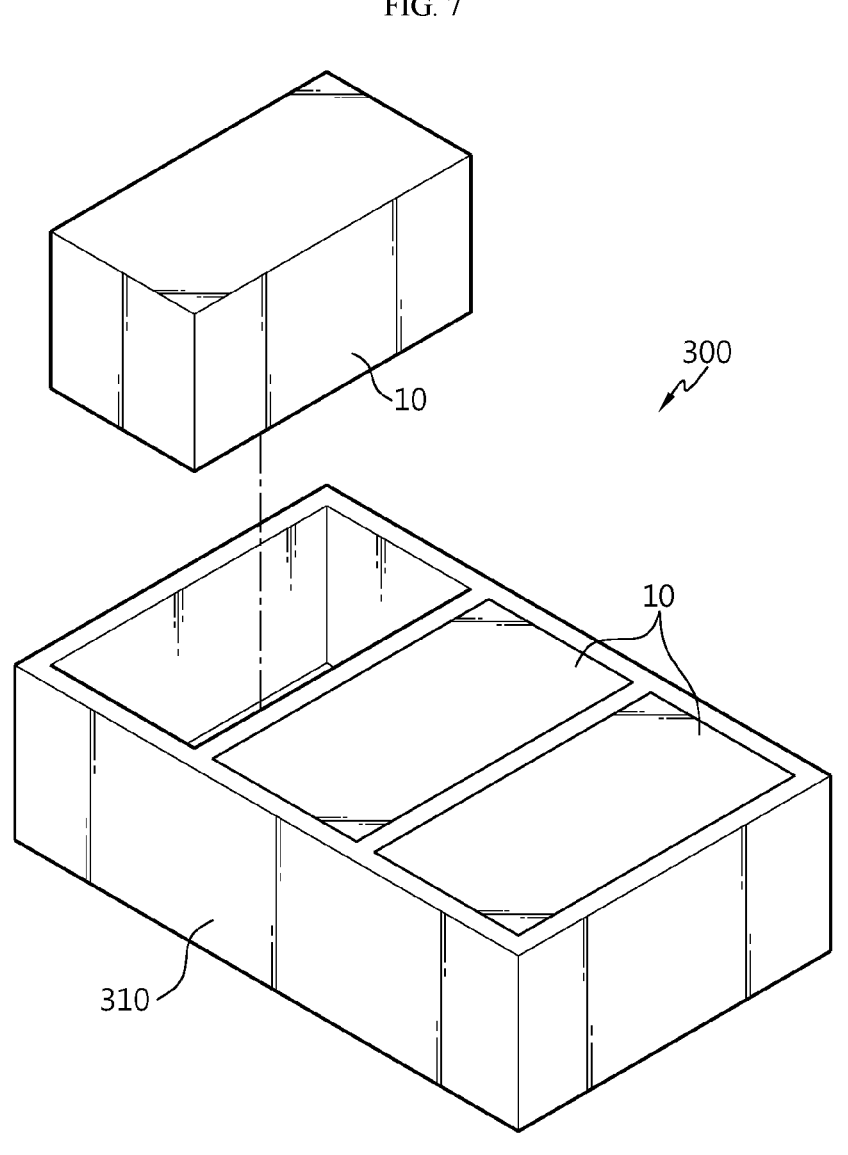
FIG. 7 is a schematic view illustrating a battery pack, according to an embodiment of the present disclosure.
Figure 8:
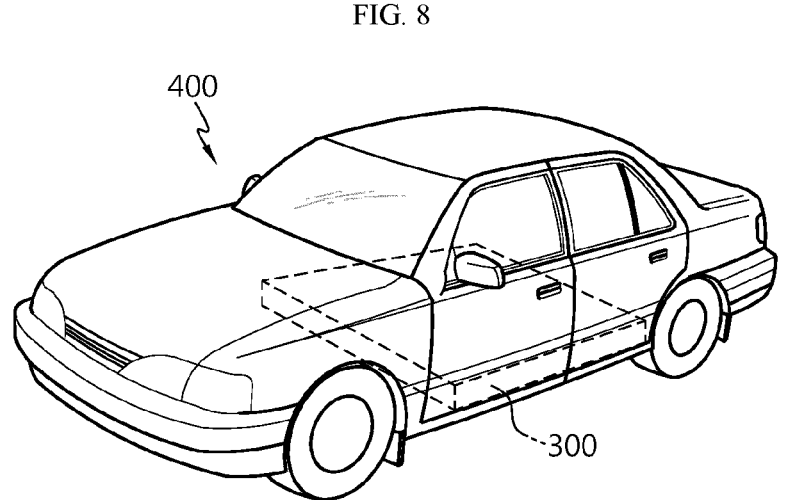
FIG. 8 is a schematic view illustrating a vehicle, according to an embodiment of the present disclosure.

FIG. 7 is a schematic view illustrating a battery pack, according to an embodiment of the present disclosure. FIG. 8 is a schematic view illustrating a vehicle, according to an embodiment of the present disclosure.

Referring to FIGS. 7 and 8, a battery pack 300 according to an embodiment of the present disclosure may include at least one battery module according to the present disclosure, for example, at least one battery module 10 according to an embodiment. Also, the battery pack 300 may include a pack case 310 in which the at least one battery module may be accommodated. In addition, the battery pack 300 may further include various other elements such as a relay and a current sensor, which are known at the time of filling the application, in addition to the battery module 10.

The battery modules 10 each having a substantially rectangular parallelepiped shape may be arranged in the pack case 310, and each battery module 10 is connected to ensure power required to drive a vehicle 400.

The pack case 310 is a container in which the battery modules 10 are fixedly accommodated, and is a box having a rectangular parallelepiped shape. The pack case 310 may be provided at a certain position in the vehicle 400.

Preferably, the vehicle 400 may be an electrical vehicle. The battery pack 300 may be used as an electrical energy source for driving the vehicle 400 by providing a driving force to a motor of the electric vehicle. In this case, the battery pack 300 has a high nominal voltage of 100 V or more.

The battery pack 300 may be charged or discharged by an inverter according to driving of an internal combustion engine and/or the motor. The battery pack 300 may be charged by a regenerative charging device coupled to a brake. The battery pack 300 may be electrically connected to the motor of the vehicle 400 through the inverter. Also, the battery pack 300 may be provided in another device, mechanism, and equipment such as an energy storage system (ESS) using a secondary battery as well as the vehicle.

As such, because the battery pack 300 and the device, mechanism, and equipment including the battery pack 300 such as the vehicle 400 according to an embodiment of the present disclosure include the battery module 10 described above, the battery pack 300 and the device, mechanism, and equipment including the battery pack 300 such as the vehicle 400 may have the advantages of the battery module 10.

According to the above various embodiments, even when a flame occurs in a battery module and an abnormally high temperature state is caused, flame diffusion to the outside of the battery module may be prevented. Also, according to the present disclosure, even when venting gas is generated in the battery module and an abnormally high pressure state is caused, explosion of the battery module may be prevented.

For example, even when a temperature adjacent to a module case rises to about 600° C. or higher (at least 5 minutes), the battery module including a connector as proposed in the present disclosure may withstand high temperature/high pressure (100 kpa), and thus, heat transfer may be prevented. Accordingly, according to the present disclosure, the battery module having improved safety, and a battery pack and a vehicle including the battery module may be provided.

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

DESCRIPTION OF REFERENCE NUMERALS

10: battery module
100: cell assembly
150: module case
200: connector
210: connector terminal
220: connector housing
230: connector header body
235: connector gasket

What is claimed is:
1. A battery module comprising:
a cell assembly comprising at least one battery cell;
a module case in which the cell assembly is accommodated; and
a connector mounted on the module case,
wherein the connector comprises:
    a connector terminal for electrical connection with the at least one battery cell;

a connector housing surrounding the connector terminal;
    a connector header body coupled to the connector housing and mounted on the module case so that at least a part of the connector header body is in the module case; and
    a connector gasket located between the module case and the connector header body, the connector gasket having a melting point of 1000° C. or higher,
    wherein the connector gasket extends from an outer surface of the connector housing and contacts a side surface of the connector header body.

2. The battery module according to claim 1, wherein an opening is formed in the module case, and the connector header body is in surface contact with the module case via the connector gasket to keep the opening airtight.

3. The battery module according to claim 2, wherein the connector gasket has a frame shape with a central opening of a same size as a size of the opening.

4. The battery module according to claim 2, wherein the connector gasket and the connector header body are fastened to the module case with a bolt.

5. The battery module according to claim 1, wherein the connector gasket is a silicone gasket.

6. The battery module according to claim 1, wherein the connector header body is formed of a ceramic or metal material with a melting point of 1000° C. or higher.

7. The battery module according to claim 1, wherein the connector housing is coupled to the connector header body by press-fitting.

8. A battery pack comprising:
at least one battery module according to claim 1; and
a pack case for packaging the at least one battery module.

9. A vehicle comprising at least one battery pack according to claim 8.

10. The battery module according to claim 1, wherein the connector housing extends from a side surface of the connector header body, and
    wherein the connector gasket directly contacts the outer surface of the connector housing and directly contacts the side surface of the connector header body.

11. The battery module according to claim 1, wherein the connector gasket extends to a top edge and a bottom edge of the connector header body.

12. The battery module according to claim 1, wherein the connector gasket has a central aperture having a shape corresponding to a shape of the connector housing.

13. The battery module according to claim 12, wherein the connector gasket has an outer perimeter having a shape corresponding to a shape of the connector header body.

\* \* \* \* \*